(12) United States Patent
Osgood et al.

(10) Patent No.: US 9,042,136 B2
(45) Date of Patent: May 26, 2015

(54) MAGNETIC FLUX CONVERSION DEVICE

(75) Inventors: George N. Osgood, Portland, OR (US); Lee V. Gassaway, Aloha, OR (US)

(73) Assignee: EnGen Technologies LLC, Portland, OR (US)

( * ) Notice: Subject to any disclaimer, the term of this patent is extended or adjusted under 35 U.S.C. 154(b) by 580 days.

(21) Appl. No.: 13/365,242

(22) Filed: Feb. 2, 2012

(65) Prior Publication Data
US 2013/0201739 A1    Aug. 8, 2013

(51) Int. Cl.
*H02M 7/155*    (2006.01)
*H02M 1/32*    (2007.01)

(52) U.S. Cl.
CPC ............... *H02M 7/155* (2013.01); *H02M 1/32* (2013.01)

(58) Field of Classification Search
CPC ....... H02M 7/155; H02M 7/06; H02M 7/062; H02M 1/092; H02M 7/1577; H02H 7/127; G05F 3/36; G05F 1/33; Y02B 70/126
USPC ........ 323/247, 293, 254, 328; 363/52–54, 74, 363/75, 78, 81, 82, 85, 89, 90, 125
See application file for complete search history.

(56) References Cited

U.S. PATENT DOCUMENTS

| | | | |
|---|---|---|---|
| 7,570,020 B1 | 8/2009 | Kranzen et al. | |
| 8,233,301 B1 * | 7/2012 | Guo | 363/140 |
| 2001/0040458 A1 * | 11/2001 | Macbeth et al. | 324/536 |
| 2009/0167087 A1 | 7/2009 | Clemo et al. | |
| 2009/0195214 A1 | 8/2009 | Gehrke et al. | |
| 2009/0206666 A1 | 8/2009 | Sella et al. | |
| 2009/0284240 A1 | 11/2009 | Zhang et al. | |
| 2010/0213862 A1 | 8/2010 | Ger et al. | |
| 2010/0290164 A1 * | 11/2010 | Kinsel | 361/45 |
| 2011/0103112 A1 * | 5/2011 | Jiang et al. | 363/125 |

* cited by examiner

*Primary Examiner* — Jessica Han
*Assistant Examiner* — Gustavo Rosario Benitez
(74) *Attorney, Agent, or Firm* — Schwabe, Williamson & Wyatt

(57) ABSTRACT

Embodiments provide a magnetic flux conversion device (MFCD) that may produce a regulated output signal with a target value (e.g., target voltage and/or target current) from a source signal on a power line. The MFCD may include a secondary stage configured to be inductively coupled with the power line. The source signal may cause a secondary electrical signal to flow in the secondary stage. A regulator module may be coupled to the secondary stage and configured to produce the output signal with the target value across output nodes by sensing the output signal and shunting the secondary stage if a value of the output signal is above the target value.

14 Claims, 4 Drawing Sheets

MAGNETIC FLUX CONVERSION DEVICE

TECHNICAL FIELD

Embodiments herein relate to a device for producing a regulated power supply signal with a target value from a source signal on a power line.

BACKGROUND

Electric power transmission lines are used to carry electricity at a high voltage from a power plant and distribute the electrical power to various locations where the power is consumed. Overhead power lines are typically strung between utility poles. Many of the utility poles have transformers mounted thereon to step down the voltage level and/or current level of the power line to a level that is usable to power electrical devices. For example, street lights are often mounted on the utility poles and powered by the electrical power carried by the power line. However, electrical devices that are placed in between utility poles must be wired to the nearest utility pole with a transformer to receive power.

Furthermore, there are many long spans of power line (such as across rivers, valleys, etc.) over which the power line extends a long distance between utility poles. It is difficult and/or impractical to place an electrical device in these long spans and power the electrical device from the power line.

BRIEF DESCRIPTION OF THE DRAWINGS

Embodiments will be readily understood by the following detailed description in conjunction with the accompanying drawings and the appended claims. Embodiments are illustrated by way of example and not by way of limitation in the figures of the accompanying drawings.

DETAILED DESCRIPTION OF DISCLOSED EMBODIMENTS

Figure 1:
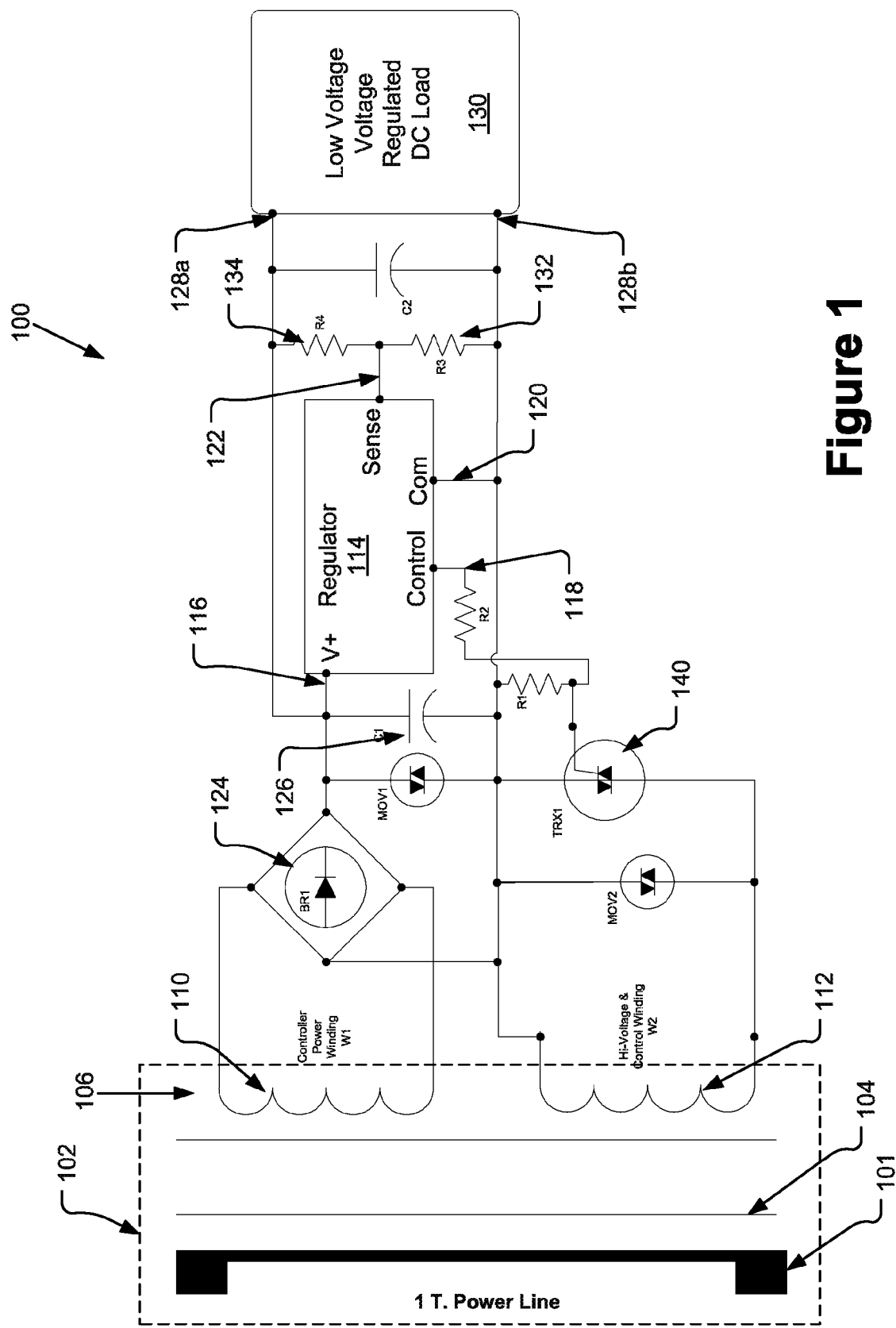
FIG. 1 illustrates a magnetic flux conversion device configured to provide power to a low voltage voltage-regulated direct current (DC) load in accordance with one embodiment.

In the following detailed description, reference is made to the accompanying drawings which form a part hereof, and in which are shown by way of illustration embodiments that may be practiced. It is to be understood that other embodiments may be utilized and structural or logical changes may be made without departing from the scope. Therefore, the following detailed description is not to be taken in a limiting sense, and the scope of embodiments is defined by the appended claims and their equivalents.

Various operations may be described as multiple discrete operations in turn, in a manner that may be helpful in understanding embodiments; however, the order of description should not be construed to imply that these operations are order dependent.

The description may use perspective-based descriptions such as up/down, back/front, and top/bottom. Such descriptions are merely used to facilitate the discussion and are not intended to restrict the application of disclosed embodiments.

The terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

For the purposes of the description, a phrase in the form "A/B" or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A)B" means (B) or (AB) that is, A is an optional element.

The description may use the terms "embodiment" or "embodiments," which may each refer to one or more of the same or different embodiments. Furthermore, the terms "comprising," "including," "having," and the like, as used with respect to embodiments, are synonymous, and are generally intended as "open" terms (e.g., the term "including" should be interpreted as "including but not limited to," the term "having" should be interpreted as "having at least," the term "includes" should be interpreted as "includes but is not limited to," etc.).

With respect to the use of any plural and/or singular terms herein, those having skill in the art can translate from the plural to the singular and/or from the singular to the plural as is appropriate to the context and/or application. The various singular/plural permutations may be expressly set forth herein for sake of clarity.

In various embodiments, methods, apparatuses, and systems for a magnetic flux conversion device are provided. In exemplary embodiments, a computing device may be endowed with one or more components of the disclosed apparatuses and/or systems and may be employed to perform one or more methods as disclosed herein.

Embodiments herein provide a magnetic flux conversion device (MFCD). The MFCD may provide a regulated output signal from a conductor, such as a power line, carrying an alternating current (AC) source signal. The output signal may be regulated to have a target value that remains substantially constant, such as a target voltage value and/or a target current value. In some embodiments the regulated output signal may be a direct current (DC) signal. The MFCD may produce the regulated power output over a wide range of voltages and/or currents of the AC source signal. The output signal may be used to supply electrical power to one or more electrical devices, such as lights (e.g., street lights and/or obstruction lights), sensors, communication devices, and/or cameras.

FIG. 1 illustrates a MFCD 100 in accordance with various embodiments. MFCD 100 may include magnetic laminations 104 and a secondary stage 106 configured to form a transformer 102 with a power line 101. The power line 101 may also be referred to as the primary stage of transformer 102. In some embodiments the secondary stage 106 may include a pair of secondary inductors 110 and 112 (e.g., a first inductor 110 and a second inductor 112). In other embodiments the secondary stage 106 may only include a single secondary inductor.

In various embodiments, the power line 101 may carry an AC source signal. The source signal may create a magnetic field around the power line 101. The secondary stage 106 may be inductively coupled to the power line 101 (e.g., through magnetic laminations 104) so that the magnetic field causes a secondary electrical signal to flow in the secondary stage 106.

The MFCD 100 may further include a regulator module 114 that receives the secondary electrical signal. The regulator module 114 may include one or more terminals, including a supply terminal 116, a control terminal 118, a common terminal 120, and/or a sense terminal 122. The regulator module 114 may receive the secondary electrical signal at the supply terminal 116. The other terminals will be discussed in more detail below.

In some embodiments, the MFCD 100 may include a rectifier 124 coupled to the secondary stage 106 (e.g., to the first inductor 110). The rectifier 124 may convert the secondary electrical signal from an AC signal to a DC signal prior to passing the secondary electrical signal to the regulator module 114. Additionally, the MFCD 100 may include a capacitor 126 coupled between the supply terminal 116 and the common terminal 120 to prevent/reduce ripples in the DC secondary electrical signal.

The MFCD 100 may include a pair of output nodes 128a-b. In various embodiments, the regulator module 114 may produce an output signal with a target value across the pair of output nodes 128a-b. The target value may be at least one of a voltage value and a current value.

In various embodiments, the regulator module 114 may produce the output signal with the target value by sensing the output signal and shunting the secondary stage 106 if a value of the output signal is above the target value. In some embodiments the regulator module 114 may receive a first voltage at the sense terminal 122 that is indicative of the value (e.g., voltage value and/or current value) of the output signal. The regulator module 114 may determine if the value of the output signal is above the target value by comparing the first voltage with a reference voltage. The reference voltage may be selected so that the first voltage will be substantially equal to the reference voltage if the value of the output signal is equal to the target value. If the first voltage is above the reference value, the regulator module 114 may shunt the secondary stage 106.

When the secondary stage 106 is shunted, the voltage and/or current of the output signal may decrease. The transformer 102 may convert from a voltage transformer into a current generating transformer with a shorted secondary stage 106. In contrast, when the secondary stage 106 is not shunted, the secondary electrical signal will be fed to the output nodes, causing the voltage and/or current of the output signal to decrease. Accordingly, the regulator module 114 may repeatedly switch the secondary stage between shunted state and an active (e.g., forward) state in which the secondary stage is not shunted in order to maintain the output signal at the target value.

In some embodiments, as shown in FIG. 1, the MFCD 100 may be configured to provide the output signal to power an electronic device 130 having a voltage-regulated DC load, such as a low-voltage voltage-regulated DC load. For example, the target value may be about 12 Volts (V). For a voltage-regulated load, the MFCD 100 may include a voltage divider having a first resistor 132 and a second resistor 134 coupled between the output nodes 128a-b. The voltage divider may produce the first voltage from the output signal and provide the first voltage at the sense terminal. In this case, the first voltage may be indicative of the voltage value of the output signal. For example, the voltage divider may cause the first voltage to be one-tenth of the voltage value of the output signal. In that case, the reference voltage may be set at 1.2V in order to maintain the output signal at 12V.

The voltage divider may allow the regulator module 114 to operate at a lower voltage level. However, in other embodiments the regulator module 114 may compare the voltage level of the output voltage directly to the reference voltage. Additionally, any suitable values for the target value, the first and second resistors 132 and 134, and/or the reference voltage may be selected based on the particular application.

Figure 2:
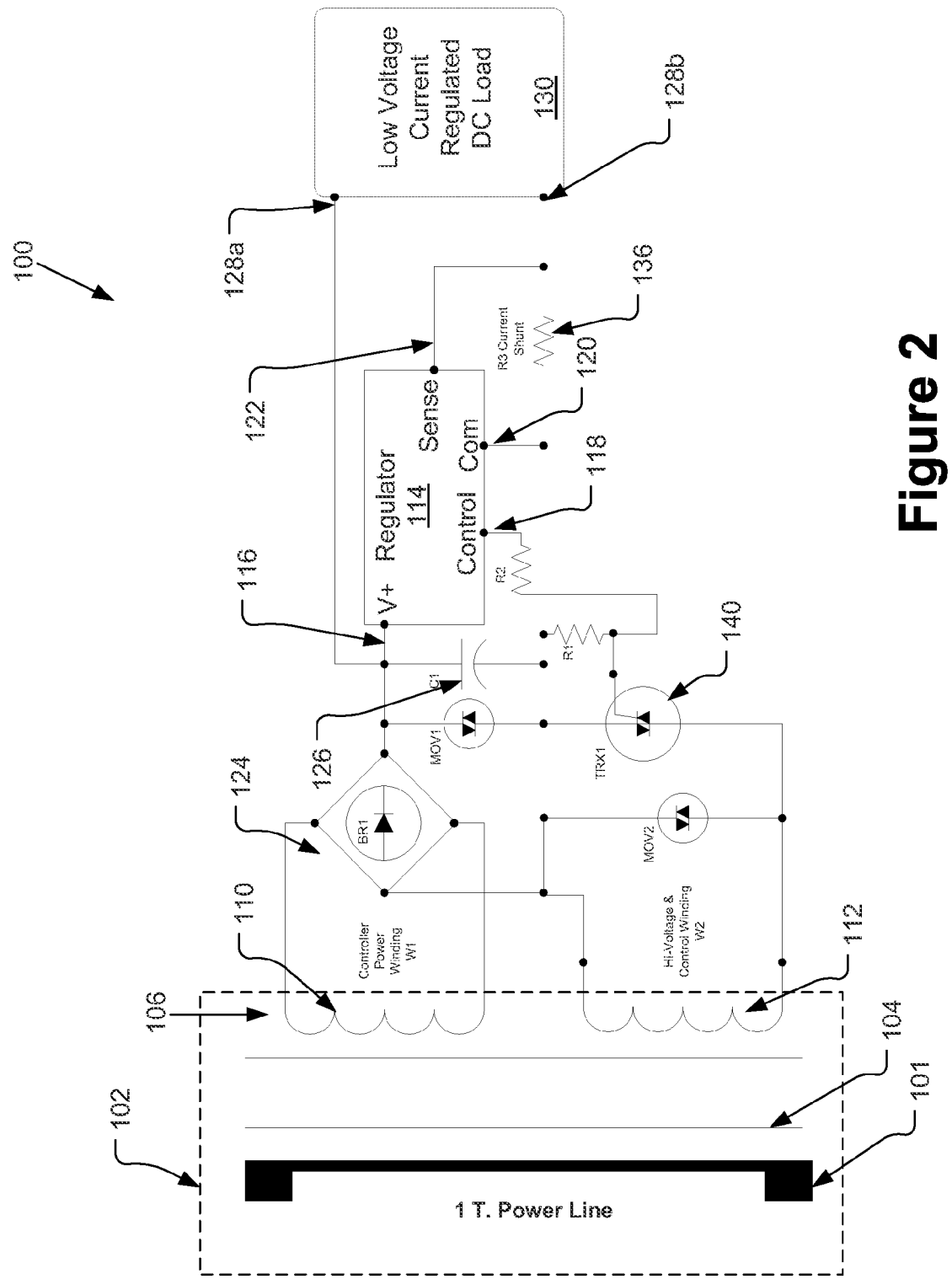
FIG. 2 illustrates a magnetic flux conversion device configured to provide power to a low voltage current-regulated DC load in accordance with another embodiment.
Figure 3:
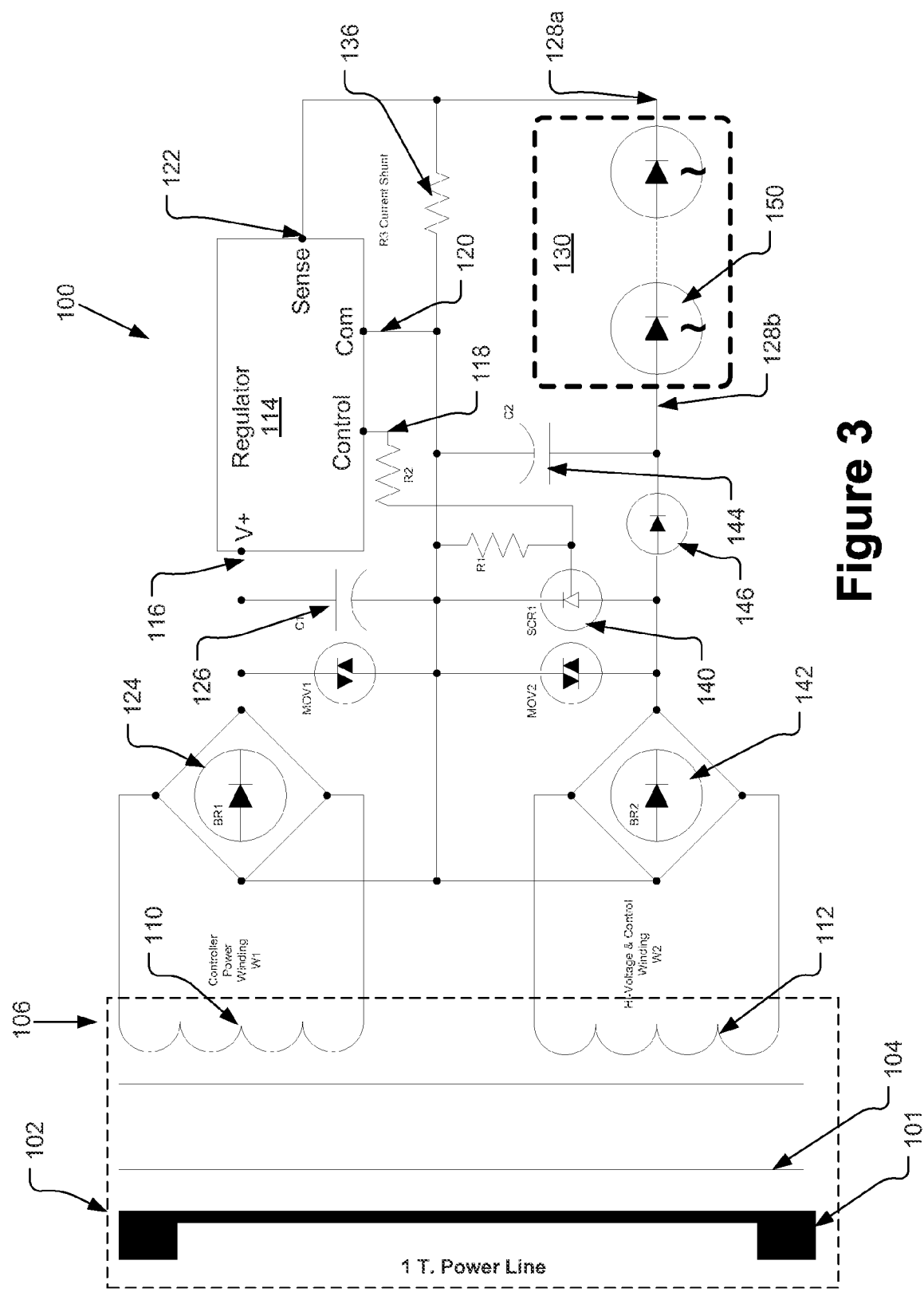
FIG. 3 illustrates a magnetic flux conversion device configured to provide power to a high-voltage current-regulated DC load in accordance with another embodiment.

As shown in FIGS. 2 and 3, in some embodiments, the MFCD 100 may be configured to produce the output signal with a target current value. In this case, a shunt resistor 136 may be coupled between the common terminal 120 and the sense terminal 122 to produce the first voltage, and the first voltage may be indicative of the current value of the output signal. The reference voltage may be selected so that the first voltage is substantially equal to the reference voltage when the current value of the output signal is equal to the target value.

Figure 4:
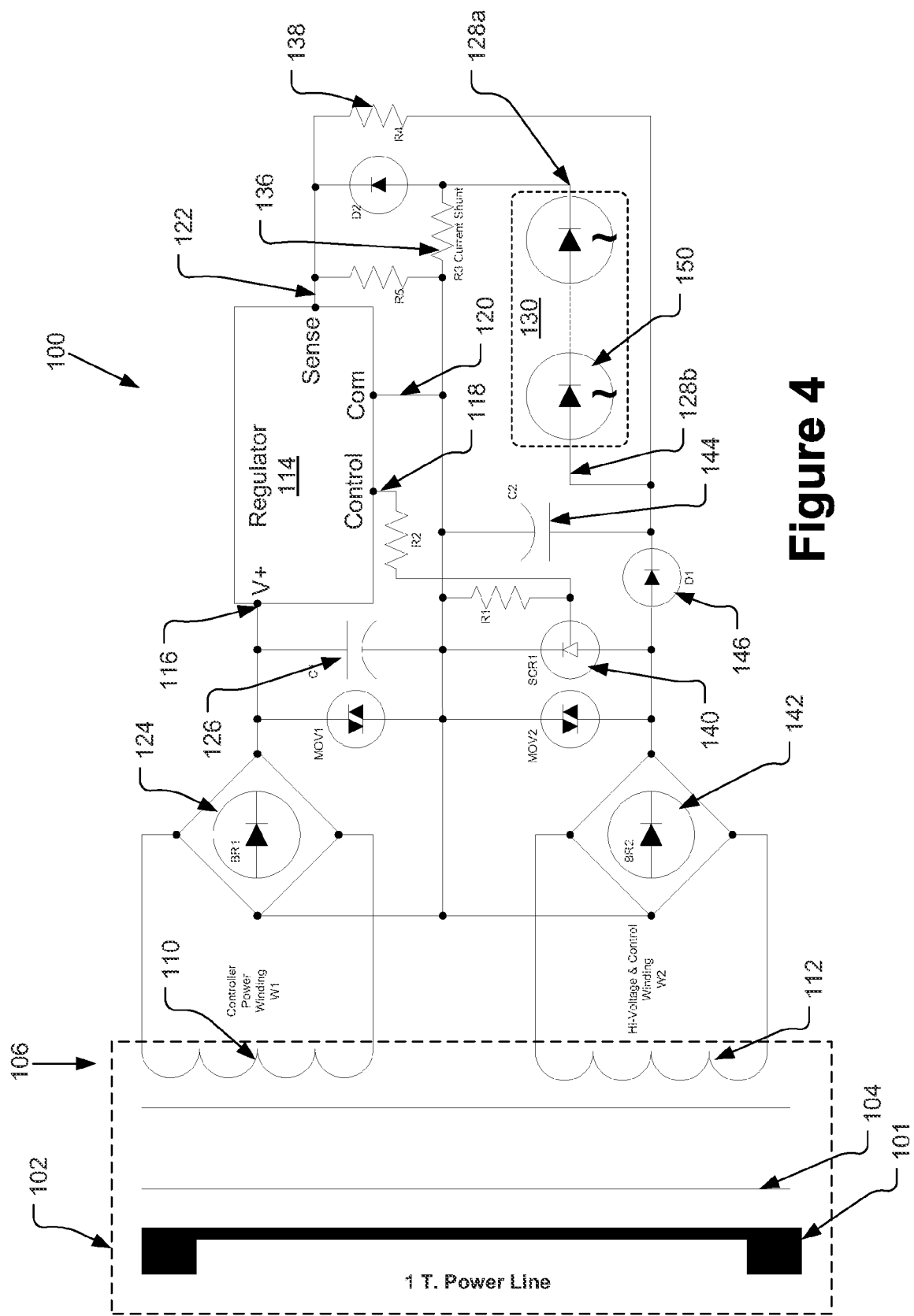
FIG. 4 illustrates a magnetic flux conversion device configured to provide power to a high-voltage voltage and current-regulated DC load in accordance with another embodiment.

In some embodiments, as shown in FIG. 4, the MFCD 100 may be configured to produce the output signal with a target voltage value and a target current value. In this case, the MFCD 100 may include a voltage divider (e.g., including first resistor 132 and second resistor 134) and a shunt resistor 136. In some embodiments, the resistance values of the first resistor 132 and second resistor 134, respectively, may be significantly greater than the resistance value of the shunt resistor 136. A diode 138 may be coupled between the shunt resistor 136 and the sense input 122 to prevent the shunt resistor 136 from interfering with the operation of the voltage divider.

In various embodiments, the MFCD 100 may include a current control device 140 to selectively shunt the secondary stage 106. For example, the current control device 140 may be a bidirectional triode thyrister (e.g., a triode for alternating current (TRIAC) as shown in FIGS. 1 and 2) and/or a silicon-controlled-rectifier (as shown in FIGS. 3 and 4). The control terminal 118 of the regulator module 114 may be coupled to a gate terminal of the current control device. The regulator module 114 may transmit a control signal on the control terminal 118 to selectively activate the current control device 140. When the current control device 140 is activated, the circuit control device 140 may create a short circuit to shunt the secondary stage 106. When the current control device 140 is not activated, the current control device 140 may form an open circuit.

In some embodiments the current control device 140 may be coupled across the second inductor 112. The current control device 140 may shunt the secondary stage 106 by forming a short circuit across the second inductor 112. When the current control device 140 is not activated, the first inductor 110 may be the primary source of the secondary electrical signal. This two-inductor design may provide improved performance compared with a single-inductor secondary stage 106 by decreasing variation in the output signal and/or decreasing power consumption.

In some embodiments, as shown in FIGS. 3 and 4, the MFCD 100 may be configured to provide an output signal having a high voltage (e.g., for an electronic device having a high-voltage load). In these embodiments, the second inductor may be configured to provide additional voltage and/or current. A second rectifier 142 may be coupled across the second inductor 112 to convert the electric signal from the second inductor 112 from AC to DC. A high-voltage capacitor 144 may be coupled between the common terminal 120 and output node 128b to facilitate maintenance of the high voltage of the output signal. A diode 146 may be coupled between the capacitor 144 and the second inductor 112 to prevent the capacitor 144 from discharging when the second inductor 112 is shunted.

The MFCD 100 may be used to produce an output signal to supply power for a wide variety of electronic devices with different loads, such as devices having a low-voltage voltage-regulated load (as shown in FIG. 1), a low-voltage current-regulated load (as shown in FIG. 2), a high-voltage current-regulated load (as shown in FIG. 3), and/or a high-voltage voltage and current regulated load (as shown in FIG. 4). Furthermore, the MFCD 100 may produce the regulated output signal over a wide range of values of the input source signal. For example, in one application of MFCD 100, the MFCD 100 may harvest about 12 Watts from a 130 kiloVolts AC (KVAC) power line that may conduct currents of about 50 Amps to about 2500 Amps. Or, said differently, the MFCD 100 may harvest 12 Watts from a 6.5 Mega-Watt to 325 Mega-Watt 130 KVAC power line.

In various embodiments, the MFCD 100 may be coupled to any suitable electronic device 130 to provide power to the electronic device 130. For example, the electronic device 130 may include one or more lights (e.g., light-emitting-diode (LED) lights), sensors, communications devices, cameras, and/or other devices. In some embodiments, the lights may be used to illuminate an area around the power line 101 (e.g., a street light). In other embodiments, the lights may be used for obstruction lighting to alert flying objects, such as planes, about the location of the power line 101. In some embodiments, the sensors may be used to measure parameters that effect performance of the power line 101, such as temperature and/or line sag. In other embodiments, the sensors may measure any suitable parameter.

In some embodiments, the electronic device 130 may further include a communication module for transmitting and/or receiving signals (such as data and/or control signals). This may allow the electronic device 130 to transmit the data measured by the sensors and/or receive control signals to control the sensors, lights, and/or camera, for example. Additionally, the electronic device 130 may include a communication device for establishing and/or extending a communication network, such as a wireless communication network.

In some embodiments, the electronic device 130 may include an array of one or more LED lights 150 (as shown in FIGS. 3 and 4). In one embodiment, the array of LEDs 150 may require a current of about 300 mA for full brightness, and may require a high voltage (e.g., about 160 to about 230 VDC). Accordingly, the high-voltage current-regulated MFCD 100 shown in FIG. 3 and/or the high-voltage voltage and current-regulated MFCD 100 shown in FIG. 4 may be used to supply power to the LEDs 150. In other embodiments, any suitable output voltage and/or output current may be provided by the MFCD 100.

In various embodiments, the first inductor 110 and the second inductor 112 may have any suitable number of turns. The first inductor 110 may have the same or different number of turns as the second inductor 112. For example, in one embodiment the first inductors may have about 30 turns and the second inductor 112 may have about 300 turns. This quantity of turns may be suitable to produce an output signal of about 12V in the configurations of MFCD 100 in FIGS. 1 and 2, and/or to produce an output signal of about 160-230V in the configurations of MFCD 100 in FIGS. 3 and 4. The number of turns may be selected depending on the desired output voltage and/or other factors.

In some embodiments, the magnetic laminations 104 may be a single loop. The magnetic laminations 104 may be split core and may be placed around the power line 101.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope. Those with skill in the art will readily appreciate that embodiments may be implemented in a very wide variety of ways. This application is intended to cover any adaptations or variations of the embodiments discussed herein. Therefore, it is manifestly intended that embodiments be limited only by the claims and the equivalents thereof.

What is claimed is:

1. A circuit, comprising:
   a secondary stage configured to be inductively coupled with a power line carrying an alternating current (AC) source signal, wherein the power line acts as a primary stage to form a transformer with the secondary stage so that a magnetic field of the power line provides a secondary electrical signal in the secondary stage; a pair of output nodes;
   a regulator module configured to receive the secondary electrical signal and to produce an output signal with a target value across the pair of output nodes, wherein the regulator module, to produce the output signal with the target value, is to: receive a first voltage that is indicative of a value of the output signal across the pair of output nodes;
   receive a reference voltage that corresponds to the target value; and shunt the secondary stage if the first voltage is greater than the reference voltage, a rectifier coupled to the secondary stage and configured to convert the secondary electrical signal from an AC signal to a direct current (DC) secondary electrical signal and to provide the DC secondary electrical signal to the regulator module;
   wherein the secondary stage includes a first inductor and a second inductor, wherein the first inductor is configured to provide the secondary electrical signal, and the regulator module is configured to shunt the secondary stage by shunting the second inductor.

2. The circuit of claim 1, wherein the target value is a voltage value.

3. The circuit of claim 1, wherein the target value is a current value.

4. The circuit of claim 1, wherein the target value is a voltage value and the circuit further comprising a voltage divider configured to produce the first voltage from the output signal.

5. The circuit of claim 1, wherein the target value is a current value and the circuit further comprising a shunt resistor configured to produce the first voltage from the output signal.

6. The circuit of claim 1, further comprising a current control device coupled across the secondary inductor, wherein the current control device creates a short circuit across the secondary inductor when activated, and wherein the regulator module is configured to selectively activate the current control device.

7. The circuit of claim 1, further comprising a high-voltage capacitor coupled to at least one of the pair of output nodes.

8. A circuit, comprising:
   a secondary stage including a first inductor and a second inductor configured to be inductively coupled with a power line carrying a source signal, wherein the power line acts as a primary stage to form a transformer with the secondary stage, and wherein the first inductor is configured to provide a secondary electrical signal derived from the source signal via the transformer;

a pair of output nodes configured to receive an output signal;

a regulator module coupled to the secondary stage to derive the output signal from the secondary electrical signal, the regulator module configured to:

receive a first voltage derived from the output signal;

compare the first voltage to a reference voltage that corresponds to a target value of the output signal; and shunt the second inductor if the first voltage is greater than the reference voltage to provide the output signal with the target value; and a rectifier coupled to the first inductor and configured to convert the secondary electrical signal from an alternating current (AC) signal to a direct current (DC) secondary electrical signal and to provide the DC secondary electrical signal to the regulator module.

9. The circuit of claim 8, wherein the target value is a target voltage, and the circuit further comprising a voltage divider configured to produce the first voltage from the output signal, the first voltage indicative of a voltage level of the output signal.

10. The circuit of claim 8, wherein the target value is a target current, and the circuit further comprising a shunt resistor configured to produce the first voltage from the output signal, the first voltage being indicative of a current value of the output signal.

11. A system, comprising:

an electrical device configured to receive a direct current (DC) output signal having a target value;

a magnetic flux conversion device (MFCD) coupled to the electrical device, the MFCD including a pair of output nodes and configured to provide the output signal to the electrical device at the output nodes, and the MFCD further including:

a secondary stage including a first inductor and a second inductor configured to be inductively coupled with a power line carrying an alternating current (AC) source signal, wherein the power line acts as a primary stage to form a transformer with the secondary stage, and wherein the source signal provides a secondary electrical signal across the first inductor via the transformer;

a rectifier coupled to the first inductor to convert the secondary electrical signal from an AC signal to a direct current (DC) secondary electrical signal; and a regulator module configured to receive the DC secondary electrical signal and to produce the output signal by sensing the output signal and shunting the second inductor if a value of the output signal is above the target value, wherein the regulator module is configured to receive a first voltage derived from the output signal, and to determine if the value of the output signal is above the target value by comparison of the first voltage with a reference voltage.

12. The circuit of claim 11, wherein the target value is at least one of a voltage value and/or a current value.

13. The circuit of claim 11, wherein the target value is a voltage value and the circuit further comprising a voltage divider configured to produce the first voltage from the output signal.

14. The circuit of claim 11, wherein the target value is a current value and the circuit further comprising a shunt resistor configured to produce the first voltage from the output signal.

* * * * *